(12) United States Patent
Baptist et al.

(10) Patent No.: US 10,082,970 B2
(45) Date of Patent: *Sep. 25, 2018

(54) STORING AN EFFECTIVE DYNAMIC WIDTH OF ENCODED DATA SLICES

(71) Applicant: International Business Machines Corporation, Armonk, NY (US)

(72) Inventors: Andrew D. Baptist, Mt. Pleasant, WI (US); Greg R. Dhuse, Chicago, IL (US); Jason K. Resch, Chicago, IL (US); Ilya Volvovski, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,194

(22) Filed: Feb. 20, 2017

(65) Prior Publication Data
US 2017/0160966 A1    Jun. 8, 2017

Related U.S. Application Data

(63) Continuation-in-part of application No. 13/270,528, filed on Oct. 11, 2011.
(Continued)

(51) Int. Cl.
*G06F 17/30* (2006.01)
*G06F 7/00* (2006.01)
(Continued)

(52) U.S. Cl.
CPC ........... *G06F 3/0619* (2013.01); *G06F 3/067* (2013.01); *G06F 3/0622* (2013.01);
(Continued)

(58) Field of Classification Search
CPC .......... G06F 16/30244; G06F 17/3007; G06F 17/30073; G06F 17/30144; G06F 17/30244; G06F 3/0619
See application file for complete search history.

(56) References Cited

U.S. PATENT DOCUMENTS 4,092,732 A    5/1978    Ouchi
5,454,101 A    9/1995    Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Kannan Shanmugasundaram
(74) *Attorney, Agent, or Firm* — Garlick & Markison; Timothy W. Markison; Patricia A. Markison

(57) ABSTRACT

A method for storing a dynamic width of encoded data slices begins with determining dispersed storage error encoding parameters for encoding a data segment of data into a set of encoded data slices. The method continues by encoding the data segment into the set of encoded data slices and sending a set of write requests regarding the set of encoded data slices to a set of storage units. The method continues by receiving write responses from at least some storage units and when at least a write threshold number of favorable write responses have been received within a first time period, by sending a set of write commit requests to the at least some storage units. When less than an initial dynamic width number of favorable write responses have been received, the method continues by flagging a rebuild number of encoded data slices.

16 Claims, 7 Drawing Sheets

| write operation ||
|---|---|
| # of EDSs with successful response | write result |
| < write threshold | write failure |
| => write threshold and < dynamic WN | write success & flag EDS(s) for rebuilding |
| => dynamic WN | write success & no rebuilding flagged |

Related U.S. Application Data

(60) Provisional application No. 61/408,980, filed on Nov. 1, 2010.

(51) Int. Cl.

| | | |
|---|---|---|
| *G06F 3/06* | (2006.01) | |
| *H04L 29/06* | (2006.01) | |
| *G06F 11/10* | (2006.01) | |
| *G06F 17/00* | (2006.01) | |
| *H03M 13/15* | (2006.01) | |
| *H03M 13/00* | (2006.01) | |

(52) U.S. Cl.
CPC .......... *G06F 3/0644* (2013.01); *G06F 3/0659* (2013.01); *G06F 11/1076* (2013.01); *G06F 17/3007* (2013.01); *G06F 17/30073* (2013.01); *G06F 17/30144* (2013.01); *G06F 17/30244* (2013.01); *H04L 63/101* (2013.01); *H03M 13/1515* (2013.01); *H03M 13/616* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

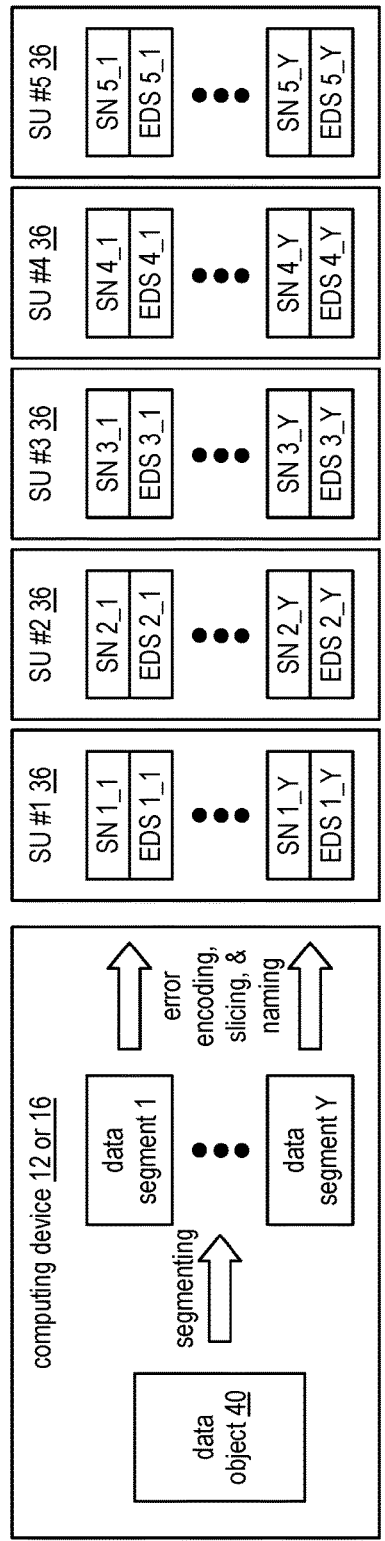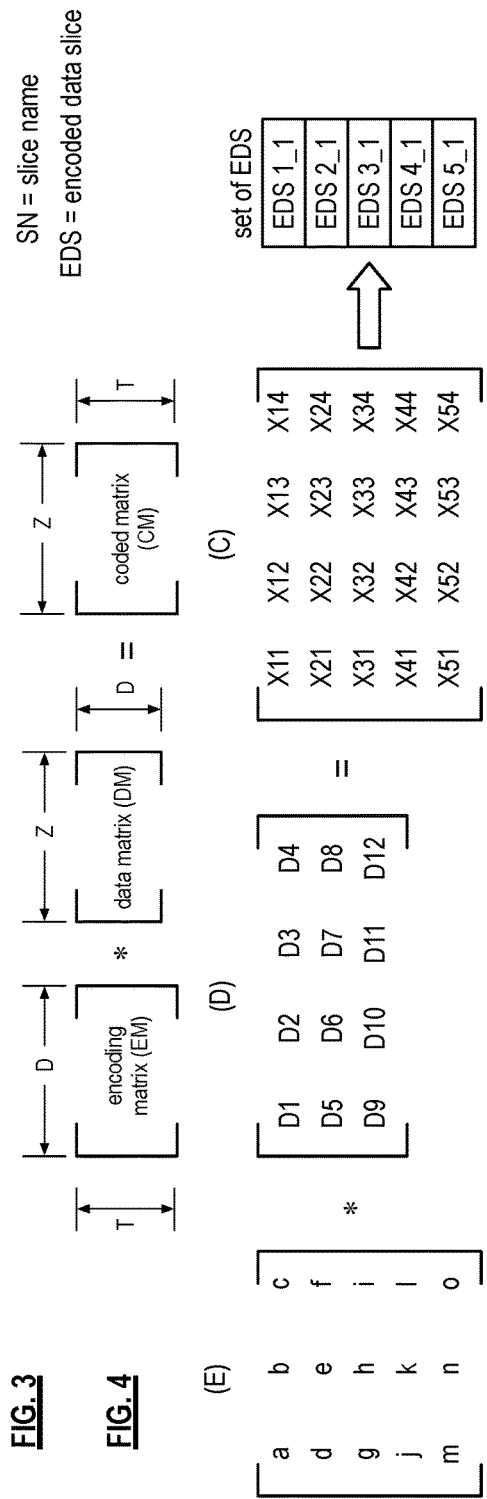
FIG. 3
FIG. 4
FIG. 5
FIG. 6

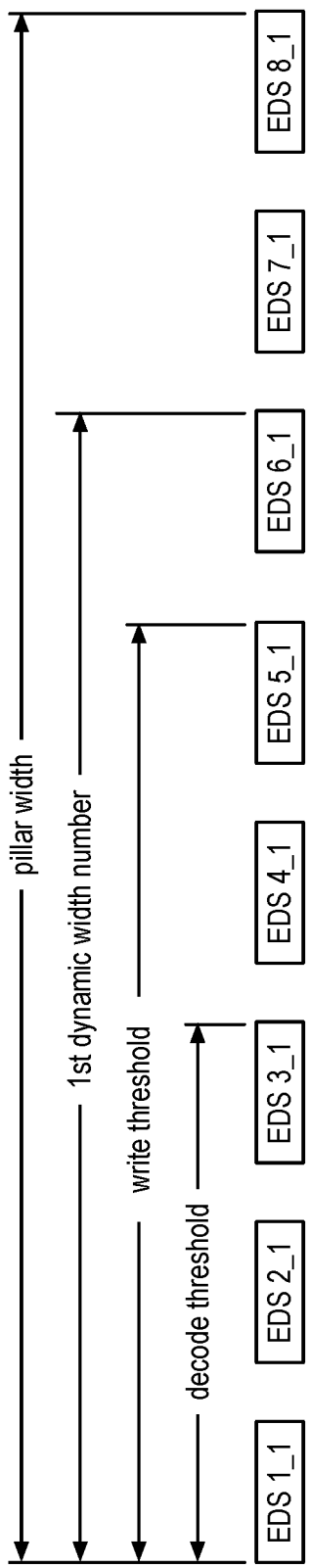

STORING AN EFFECTIVE DYNAMIC WIDTH OF ENCODED DATA SLICES

CROSS-REFERENCE TO RELATED APPLICATIONS

The present U.S. Utility Patent Application claims priority pursuant to 35 U.S.C. § 120 as a continuation-in-part of U.S. Utility application Ser. No. 13/270,528, entitled "COMPACTING DISPERSED STORAGE SPACE", filed Oct. 11, 2011, which claims priority pursuant to 35 U.S.C. § 119(e) to U.S. Provisional Application No. 61/408,980, entitled "DISPERSED STORAGE NETWORK COMMUNICATION", filed Nov. 1, 2010, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

DESCRIPTION OF RELATED ART

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9 is a schematic block diagram of an example of a set of encoded data slices in accordance with the present invention;

FIG. 10 is a write operation table of an example of a set of encoded data slices in accordance with the present invention;

DETAILED DESCRIPTION OF THE INVENTION

Figure 1:
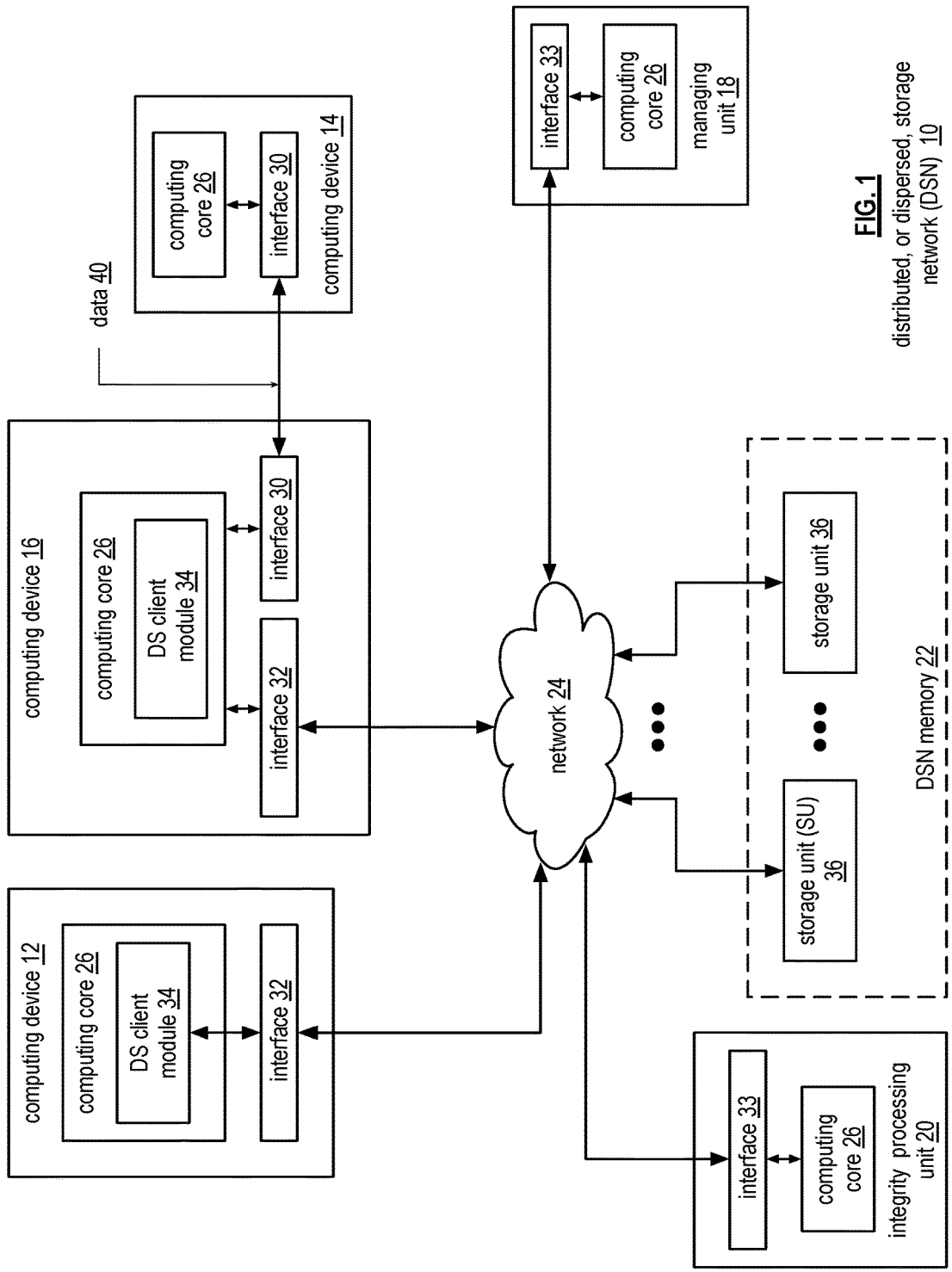
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
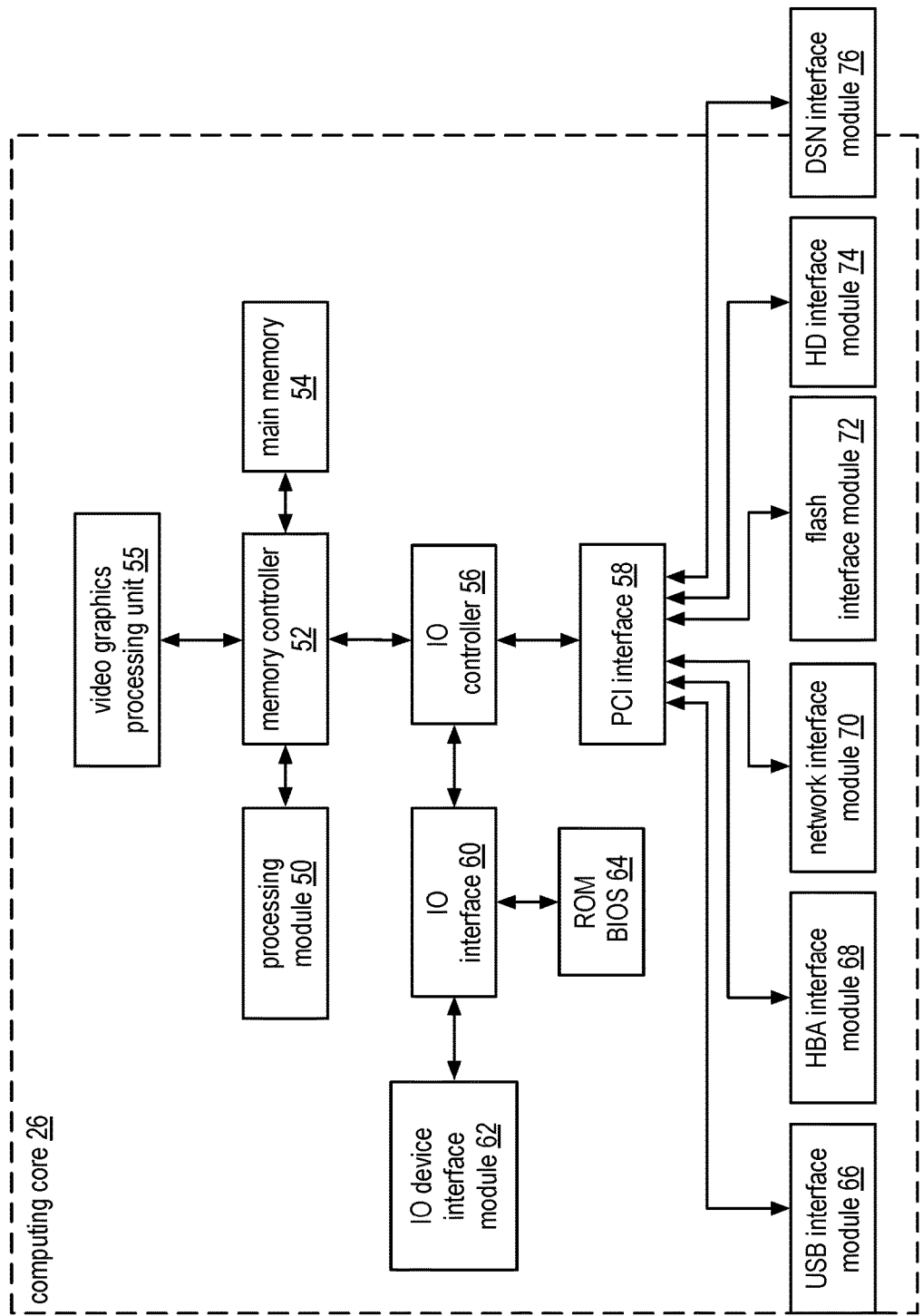
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
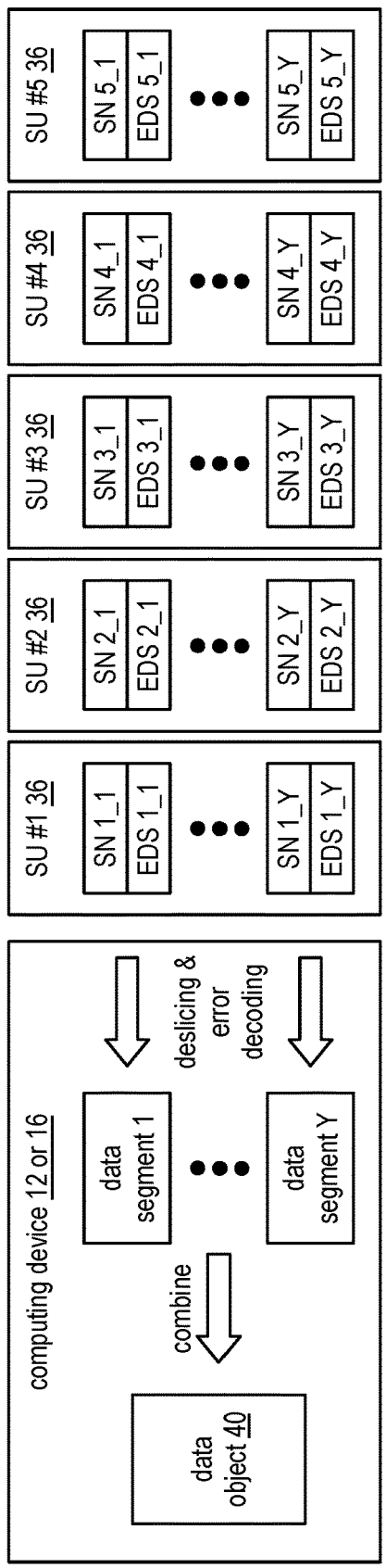
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
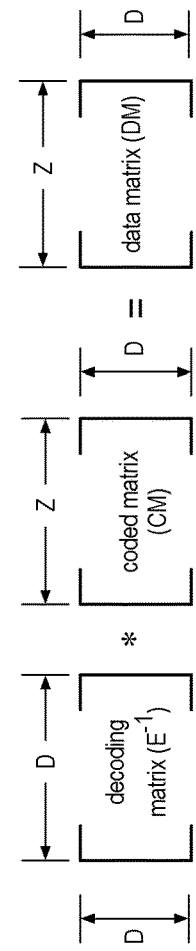
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9 is a schematic block diagram of an example of a set of encoded data slices. The set of encoded data slices are creating by dispersed storage error encoding a data segment according to dispersed storage error encoding parameters. The dispersed storage error encoding parameters may include a pillar width, a first dynamic width number, a write threshold and a decode threshold. For example, as shown, the pillar width number is 8, the first dynamic width number is 6, the write threshold number is 5, and the decode threshold number is 3. The pillar width and decode thresholds are fixed after the encoding to create the set of encoded data slices and are based on the dispersed storage error encoding parameters. The write threshold and first dynamic width number may be adjustable after the encoding and are based in part on the dispersed storage error encoding parameters and in part on preferences of the DSN (e.g., security, reliability, etc.). For example, the write threshold may be equal to or greater than the decode threshold but may not be greater than the pillar width (e.g., between 3 and 8). As another example, the first dynamic width number may be equal to or greater than the write threshold but may not be greater than the pillar width.

In an example of a write operation, the first dynamic width number is the desired number of encoded data slices to be stored. A computing device sends a set of write requests (e.g., 8) to the set of storage units and receives 5 favorable write responses. In this instance, the write operation will still be successful as long as the write threshold number of encoded data slices are stored even though the initial dynamic width number of favorable write responses were not received. However, the difference (e.g., an offset) between the number of favorable write responses and the first dynamic width number is determined and encoded data slices representing the difference are flagged for rebuilding.

In another example, a computing device proceeds with a write operation (e.g., sends a set of write commit requests) when a write threshold number of favorable write responses (e.g., 5) have been received from the set of storage units in a first time period, even though the first dynamic width number of favorable write responses were not received. However, the computing device can still complete storage of the write threshold number of encoded data slices and may flag one or more encoded data slices to be rebuilt at a later time. When the computing device has not received a write threshold number of encoded data slices (e.g., 4) within a first time period, the first dynamic width number is increased (e.g., to 7) and the computing device sends another set of write requests to at least the increased dynamic width number of storage units. Alternatively, in this example, when the computing device receives 8 favorable write responses, the computing device may determine to delete 2 of the encoded data slices by sending 6 write commit requests and 2 delete requests to the set of storage units.

FIG. 10 illustrates a write operation table. The write operation table includes a number of EDSs with successful response field and a write result field. The number of EDSs with successful response field includes a less than write threshold field, an equal to or greater than write threshold field and less than dynamic width number field and an equal to or greater than dynamic width number field. The write result field includes a write failure field, a write success and flag EDSs for rebuilding field.

For a write operation, when the computing device has received less than a write threshold number of encoded data slices with favorable responses, a write failure is indicated by the write operation table. When the computing device has received more than the write threshold number, but less than the dynamic width number of encoded data slices with favorable responses, a successful write is indicated and encoded data slices are flagged for rebuilding. When the computing device has received more than the dynamic width number of encoded data slices with favorable responses, a successful write is indicated and no encoded data slices are flagged for rebuilding. Alternatively, when the computing device has received more than the dynamic width number of encoded data slices with favorable responses, a successful write is indicated and one or more encoded data slices are flagged for deletion.

Figure 11:
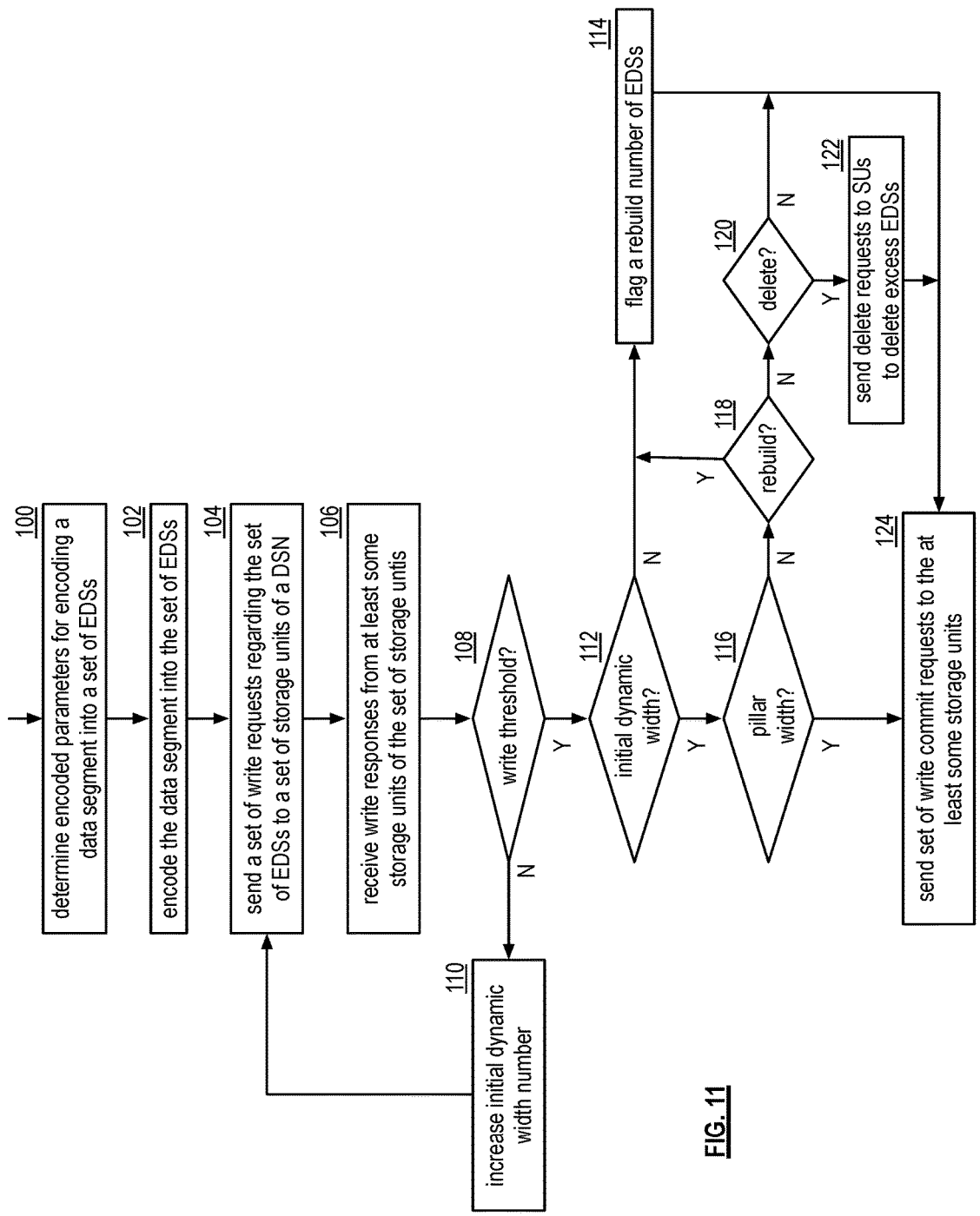
FIG. 11 is a logic diagram of an example of a method of storing a dynamic width of encoded data slices in accordance with the present invention.

FIG. 11 is a logic diagram of an example of a method of storing a dynamic width of encoded data slices. The method begins with step 100, where a computing device of a dispersed storage network (DSN) determines dispersed storage error encoding parameters for encoding a data segment of data into a set of encoded data slices. The dispersed storage error encoding parameters include a decode threshold number, a write threshold number, a pillar width number, and an initial dynamic width number. In an example, the dispersed storage error encoding parameters include a decode threshold of 3, a write threshold of 5, an initial dynamic width of 6, and a pillar width of 8. The computing device determines the initial dynamic width by one or more of storage requirements, desired reliability, a lookup, a query, historical performance of the set of storage units, data storage request message content, and a message.

The method continues with step 102, where the computing device encodes the data segment into the set of encoded data slices, wherein the set of encoded data slices includes the pillar number of encoded data slices. The method continues with step 104, where the computing device sends a set of write requests regarding the set of encoded data slices to a set of storage units of the DSN. For example, the computing device sends the initial dynamic width number (e.g., 6) of write requests to the initial dynamic width number of storage units of the set of storage units of the DSN. In another example, the computing device sends the pillar width number (e.g., 8) of write requests to the pillar width number of storage units of the set of storage units of the DSN.

The method continues with step 106, where the computing device receives write responses from at least some storage units of the set of storage units. The method continues with step 108, where the computing device determines whether at least a write threshold number of favorable write responses have been received within a first time period. When at least the write threshold number of favorable write responses have not been received within the first time period, the method continues to step 110, where the computing device increases the initial dynamic width number. In an example, when 4 or less favorable write responses have been received (e.g., less than the write threshold) within the first time period, the computing device determines to increase the initial dynamic width number (e.g., from 6 to 7). The method then loops back to step 104, where the computing device sends another set of write requests (e.g., the initial dynamic width number (e.g., 7)) to the increased dynamic width number of storage units of the DSN. Alternatively, the computing device re-sends the set of write requests (e.g., the pillar width number) to the set of storage units after increasing the initial dynamic width number. Further alternatively, the computing device may determine to increase the pillar width number, increase the first time period, select a different set of storage units or select different storage units of the set of storage units for sending the set of write requests.

When at least the write threshold number of favorable write responses have been received within a first time period, the method continues with step 112, where the computing device determines whether the initial dynamic width number of favorable write responses have been received. When at least the write threshold number, but less than the initial dynamic width number of favorable write responses have been received, the method continues with step 114, where the computing device flags a rebuild number of encoded data slices of the set of encoded data slices. The rebuild number is substantially equal to a difference between the initial dynamic width number and an actual number of favorable write responses received. For example, when the initial dynamic width number is 6 and the actual number of favorable write responses received is 5, the rebuild number is 1. In this instance, the computing device may then rebuild the flagged encoded data slice or may send the rebuild number and a rebuilding request to an integrity processing unit for rebuilding. The method continues with step 124, where the computing device sends a set of write commit requests to the at least some storage units. For example, the computing device sends 5 write commit requests to the 5 storage units that returned favorable write responses.

When more than the write threshold number and at least the initial dynamic width number of favorable write responses have been received, the method continues to step 116, where the computing device determines whether the number of favorable write responses is equal to the pillar width. When the number of favorable write responses equals the pillar width number, the method continues to step 124, where the computing device sends a set of write commit requests to the at least some storage units. When the number of favorable write responses is at least the initial dynamic width, but less than the pillar width, the method continues with step 118, where the computing device determines whether to rebuild one or more missing encoded data slices. The number of missing encoded data slices is substantially equal to a difference between the pillar width number and an actual number of favorable write responses received. When the computing device determines to rebuild, the method continues to step 114, where the computing device flags a rebuild number of encoded data slices.

Alternatively, the computing device may rebuild the one or more missing encoded data slices and send write requests regarding the one or more missing number of encoded data slices to other storage units of the set of storage units. When the computing device determines to not rebuild the at least one of the missing number of encoded data slices, the method continues to step 120, where the computing device determines whether to delete any excess encoded data slices (e.g., more than the initial dynamic width number of encoded data slices).

When the computing device determines to delete the at least one of the excess number of encoded data slices, the method continues to step 122, where the computing device sends delete requests to storage units storing the excess encoded data slices. Alternatively, the computing device may not send a write commit request to a storage unit storing an excess encoded data slice. When the computing device determines to not delete the at least one of the excess number of encoded data slices, the method continues to step 124, where the computing device sends a set of write commit requests to the at least some storage units. For example, when 7 favorable write requests have been received within the first time period and the computing device determines not to rebuild the 1 missing encoded data slice, but not to delete the excess encoded data slice, the computing device sends 7 write commit requests to 7 storage units of the set of storage units.

Subsequent to the storing of the set of encoded data slices, the computing device sends a set of read requests for the set of encoded data slices to a current dynamic width (e.g., initial or updated) number of storage units of the set of storage units. The computing device may also select an optimal number of storage units of the current dynamic width number of storage units for sending the set of read requests. The optimal number includes at least the decode threshold number and is based on one or more of latency, bandwidth, reliability, availability, security, and cost.

Figure 12:
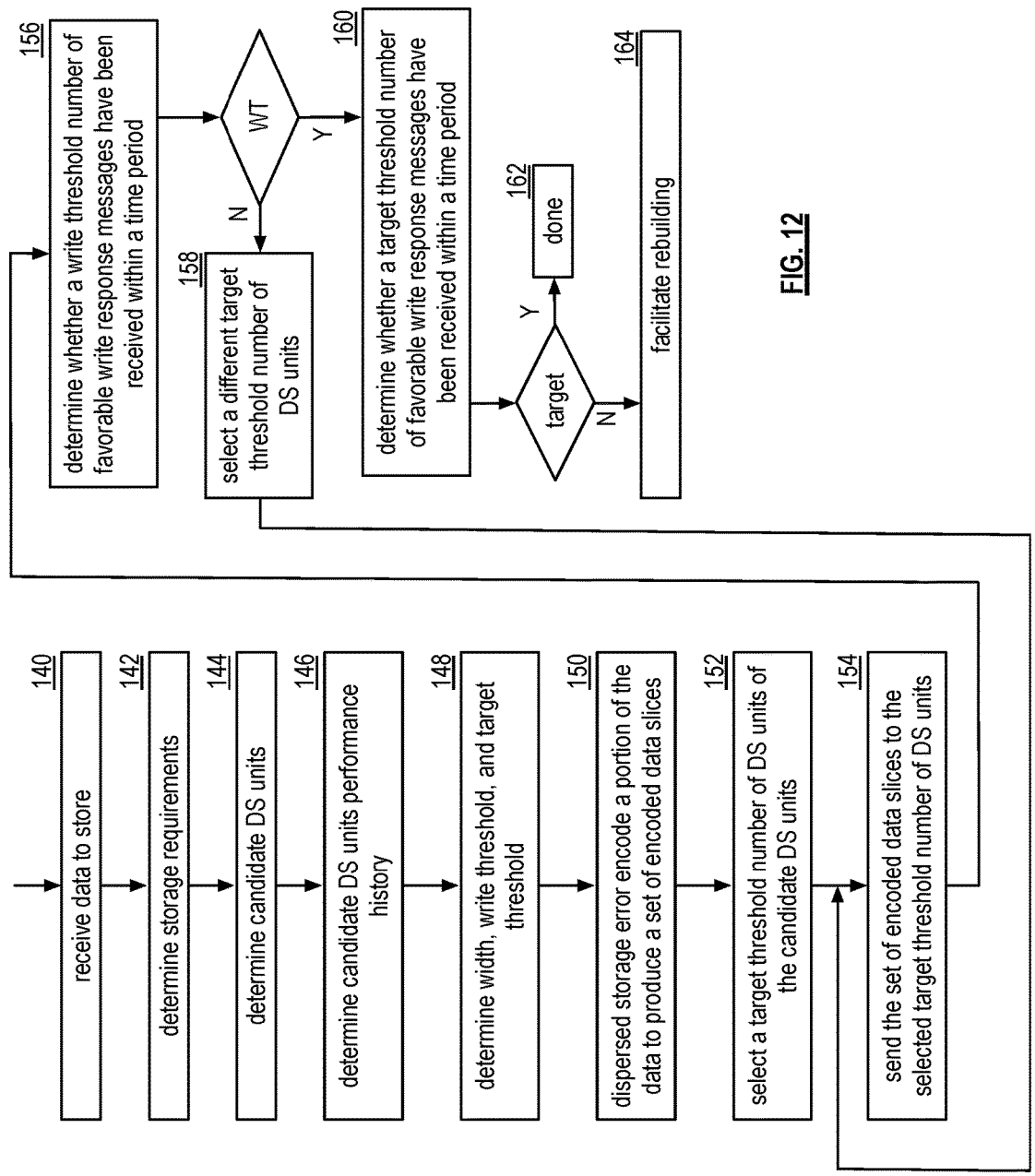
FIG. 12 is a logic diagram of an example of a method of storing encoded data slices in accordance with the present invention.

FIG. 12 is another flowchart illustrating another example of storing data. The method begins with step 140, where a processing module receives data to store. Such data may include one of a data block, a data object, and a data segment. The method continues with step 142, where the processing module determines storage requirements. Such storage requirements may include one or more requirement related to latency, bandwidth, reliability, availability, security, and cost. Such a determination may be based on one or more of a store command in a request message, a predetermination, a data identifier, a data type, a lookup, and a message. The method continues with step 144, where the processing module determines candidate dispersed storage (DS) units. Such a determination may be based on one or more of a data identifier, source name, a slice name, a virtual dispersed storage network (DSN) to physical location table lookup, a list, a query, and a message. The method continues with step 146, where the processing module determines candidate DS unit performance history. Such history may include historical data related to one or more of latency, bandwidth, reliability, availability, security, and cost. Such a determination may be based on one or more of a lookup, a query, a DS unit identifier, and a message.

The method continues with step 148, where the processing module determines a slicing pillar width, a write threshold, and a target threshold. Note that error coding dispersal storage function parameters include the slicing pillar width and the write threshold as previously discussed. Note that the target threshold is a number greater than or equal to the write threshold and less than or equal to the slicing pillar width. Such a determination may be based on one or more of the storage requirements, the candidate DS units, the candidate DS unit performance history, a comparison of the candidate DS unit performance history to the storage requirements, a lookup, a query, data storage request message content, and a message. For example, the processing module determines the slicing pillar width=32, the target threshold=15, the write threshold=12, and a decode threshold=10 when the processing module determines that there are at least 15 candidate DS units with candidate DS unit performance history that compares favorably to the storage requirements.

The method continues with step 150, where the processing module dispersed storage error encodes a portion (e.g., a data segment) of the data to produce a set of encoded data slices. The method continues with step 152 where the processing module selects a target threshold number of DS units of the candidate DS units. Such a selection may be based on one or more of the storage requirements, the candidate DS units, the candidate DS unit performance history, a comparison of the candidate DS unit performance history to the storage requirements, a lookup, a query, data storage request message content, and a message. For example, the processing module selects the target threshold number of DS units to be the DS units with the lowest latency performance history.

The method continues with step 154, where the processing module sends the set of encoded data slices to the selected target threshold number of DS units. The method continues at step 156, where the processing module determines whether a write threshold number of favorable write response messages have been received within a time period. The method branches to step 160, where the processing module determines whether a target threshold number of favorable write response messages have been received when the processing module determines that the write threshold number of favorable write response messages have been received within the time period. The method continues to step 158, when the processing module determines that the write threshold number of favorable write response messages have not been received within the time period. In step 158, the processing module selects a different target threshold number of DS units. The method repeats back to step 154, where the processing module sends the set of encoded data slices to the selected target threshold number of DS units.

The method continues with step 160, where the processing module determines whether the target threshold number of favorable write response messages have been received within a time period when the processing module determines that the write threshold number of favorable write response messages have been received within the time period. When the processing module determines that the target threshold number of favorable write response messages has not been received within the time period, the method branches to step 164. The method ends at step 162, when the processing module determines that the target threshold number of favorable write response messages has been received within the time period. The method continues with step 164, where the processing module facilitates rebuilding when the processing module determines that the target threshold number of favorable write response messages has not been received within the time period. Note that in this scenario, the data may be retrieved since both the threshold number of DS units have confirmed storage of slices. Further note that the rebuilding process may now write slices to all of the DS units for each pillar. Note that the method may provide a system performance improvement (e.g., latency to successfully store the data) by initially sending slices to the target threshold number of DS units rather than to all DS units of the slicing pillar width.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN), the method comprises:
   determining dispersed storage error encoding parameters for encoding a data segment of data into a set of encoded data slices, wherein the dispersed storage error encoding parameters include a decode threshold number, a write threshold number, a pillar width number, and an initial dynamic width number;
   encoding the data segment into the set of encoded data slices, wherein the set of encoded data slices includes the pillar width number of encoded data slices;
   sending a set of write requests regarding the set of encoded data slices to a set of storage units of the DSN;
   receiving write responses from at least some storage units of the set of storage units; and
   when at least the write threshold number of favorable write responses have been received within a first time period:
      sending a set of write commit requests to the at least some storage units; and
      when less than the initial dynamic width number of favorable write responses have been received, flagging a rebuild number of encoded data slices of the set of encoded data slices, wherein the rebuild number is substantially equal to a difference between the initial dynamic width number and an actual number of favorable write responses received.

2. The method of claim 1 further comprises:
   determining the initial dynamic width by one or more of:
      storage requirements;
      desired reliability;
      a lookup;
      a query;
      historical performance of the set of storage units;
      data storage request message content; and
      a message.

3. The method of claim 1, wherein the sending the set of write requests further comprises:
   sending the pillar width number of write requests to the pillar width number of storage units of the set of storage units.

4. The method of claim 1, wherein the sending the set of write requests further comprises:
   sending the initial dynamic width number of write requests to the initial dynamic width number of storage units of the set of storage units.

5. The method of claim 4 further comprises:
   when the at least the write threshold number of favorable write responses have not been received within the first time period:

increasing the initial dynamic width number; and
sending another set of write requests to the increased dynamic width number of storage units of the set of storage units.

6. The method of claim 1 further comprises:
sending a set of read requests for the set of encoded data slices to a current dynamic width number of storage units of the set of storage units.

7. The method of claim 6 further comprises:
selecting an optimal number of storage units of the current dynamic width number of storage units for the sending the set of read requests, wherein the optimal number is based on one or more of:
latency;
bandwidth;
reliability;
availability;
security; and
cost.

8. The method of claim 1 further comprises:
when more than the initial dynamic width number and less than the pillar width number of favorable write responses have been received, determining whether to rebuild at least one of a missing number of encoded data slices, wherein the missing number is substantially equal to a difference between the pillar width number and an actual number of favorable write responses received; and
when determining to rebuild the at least one of the missing number of encoded data slices;
rebuilding the at least one of the missing number of encoded data slices; and
sending write requests regarding the at least one of the missing number of encoded data slices to other storage units of the set of storage units; and
when determining not to rebuild the at least one of the missing number of encoded data slices;
determining whether to delete at least one of an excess number of encoded data slices, wherein the excess number is substantially equal to a difference between the initial dynamic width number and the actual number of favorable write responses received; and
when determining to delete the at least one of the excess number of encoded data slices;
sending delete requests regarding the at least one of the excess number of encoded data slices to the at least some storage units of the set of storage units.

9. A computing device of a dispersed storage network (DSN), wherein the computing device comprises:
memory;
an interface; and
a processing module operably coupled to the memory and the interface, wherein the processing module is operable to:
determine dispersed storage error encoding parameters for encoding a data segment of data into a set of encoded data slices, wherein the dispersed storage error encoding parameters include a decode threshold number, a write threshold number, a pillar width number, and an initial dynamic width number;
encode the data segment into the set of encoded data slices, wherein the set of encoded data slices includes the pillar width number of encoded data slices;
send a set of write requests regarding the set of encoded data slices to a set of storage units of the DSN;
receive write responses from at least some storage units of the set of storage units; and
when at least the write threshold number of favorable write responses have been received within a first time period:
send a set of write commit requests to the at least some storage units; and
when less than the initial dynamic width number of favorable write responses have been received, flag a rebuild number of encoded data slices of the set of encoded data slices, wherein the rebuild number is substantially equal to a difference between the initial dynamic width number and an actual number of favorable write responses received.

10. The computing device of claim 9, wherein the processing module is further operable to:
determine the initial dynamic width by one or more of:
storage requirements;
desired reliability;
a lookup;
a query;
historical performance of the set of storage units;
data storage request message content; and
a message.

11. The computing device of claim 9, wherein the processing module is further operable to send the set of write requests by:
sending the set of write requests to a number of storage units of the set of storage units, wherein the number is the pillar width number.

12. The computing device of claim 9, wherein the processing module is further operable to send the set of write requests by:
sending the set of write requests to a number of storage units of the set of storage units, wherein the number is the initial dynamic width number.

13. The computing device of claim 9, wherein the processing module is further operable to:
when the at least the write threshold number of favorable write responses have not been received within the first time period:
increase the initial dynamic width number; and
send another set of write requests to the increased dynamic width number of storage units of the set of storage units.

14. The computing device of claim 9, wherein the processing module is further operable to:
send a set of read requests for the set of encoded data slices to a current dynamic width number of storage units of the set of storage units.

15. The computing device of claim 14, wherein the processing module is further operable to:
select an optimal number of storage units of the current dynamic width number of storage units for sending the set of read requests, wherein the optimal number is based on one or more of:
latency;
bandwidth;
reliability;
availability;
security; and
cost.

16. The computing device of claim 9, wherein the processing module is further operable to:
when more than the initial dynamic width number and less than the pillar width number of favorable write responses have been received:

determine whether to rebuild at least one missing number of encoded data slices, wherein the missing number is substantially equal to a difference between the pillar width number and an actual number of favorable write responses received; and when determining to rebuild the at least one missing number of encoded data slices;
  rebuild the at least one missing number of encoded data slices; and sending write requests regarding the at least one missing number of encoded data slices to other storage units of the set of storage units; and when determining not to rebuild the at least one of the missing number of encoded data slices;
  determining whether to delete at least one of an excess number of encoded data slices, wherein the excess number is substantially equal to a difference between the initial dynamic width number and the actual number of favorable write responses received; and
  when determining to delete the at least one of the excess number of encoded data slices;
    sending delete requests regarding the at least one of the excess number of encoded data slices to the at least some storage units of the set of storage units.

\* \* \* \* \*